US011969872B2

(12) United States Patent
Lin

(10) Patent No.: US 11,969,872 B2
(45) Date of Patent: Apr. 30, 2024

(54) MULTIFUNCTIONAL HAND TOOL

(71) Applicant: YIH CHENG FACTORY CO., LTD., Nantuo (TW)

(72) Inventor: Jack Lin, Nantuo (TW)

(73) Assignee: YIH CHENG FACTORY CO., LTD., Nantuo (TW)

( * ) Notice: Subject to any disclaimer, the term of this patent is extended or adjusted under 35 U.S.C. 154(b) by 193 days.

(21) Appl. No.: 17/133,164

(22) Filed: Dec. 23, 2020

(65) Prior Publication Data

US 2021/0114198 A1 Apr. 22, 2021

Related U.S. Application Data

(63) Continuation-in-part of application No. 16/052,602, filed on Aug. 1, 2018, now abandoned.

(51) Int. Cl.
*B25G 1/00* (2006.01)
*B25B 23/00* (2006.01)
*B25G 1/10* (2006.01)

(52) U.S. Cl.
CPC .......... *B25G 1/005* (2013.01); *B25B 23/0035* (2013.01); *B25G 1/102* (2013.01)

(58) Field of Classification Search
CPC ........ B25G 1/005; B25G 1/102; B25G 1/085; B25B 13/0035; B25B 23/0035
USPC ........................................................... 81/490
See application file for complete search history.

(56) References Cited

U.S. PATENT DOCUMENTS 1,281,438 A * 10/1918 Tuttle .................... B25B 13/102 81/185
3,114,401 A * 12/1963 Johnson .................. B25B 15/02 81/177.85
5,904,080 A * 5/1999 Anderson ................. B25F 1/02 81/439
6,286,400 B1 * 9/2001 Anderson .............. B25G 1/043 81/439
6,425,307 B1 * 7/2002 Chen ....................... B25B 15/02 81/439
6,494,121 B1 * 12/2002 Hu ...................... B25B 23/0042 81/439
7,228,766 B1 * 6/2007 Shyu ...................... B25G 1/005 81/177.85
2004/0206215 A1 * 10/2004 Athanasiou ............. B25B 15/02 81/177.5

* cited by examiner

*Primary Examiner* — Hadi Shakeri
(74) *Attorney, Agent, or Firm* — Chun-Ming Shih; HDLS IPR SERVICES

(57) ABSTRACT

A multifunctional hand tool has a grip and a metal working rod. The grip has an assembly hole. A polygonal coupling part is disposed on the assembly hole has. The metal working rod has two action sections, each action section has a polygonal portion, and each polygonal portion has an insertion hole. When one of the two action sections is inserted in the assembly hole, one of the two polygonal portions is engaged with the polygonal coupling part, the other action section is assembled to a suitable tool head, and a torque exerting element may be used to exert torque to the other polygonal portion or the insertion hole thereof. Accordingly, it is possible to provide versatility by having interchangeable tool heads on a top end and a bottom end of the metal working rod, and increasing torque on the top end and the bottom end.

8 Claims, 10 Drawing Sheets

MULTIFUNCTIONAL HAND TOOL

CROSS-REFERENCE TO RELATED APPLICATION

This application is a continuing-in-part application of U.S. patent application Ser. No. 16/052,602, filed on Aug. 1, 2018, and entitled "HAND TOOL FOR IMPROVING TORQUE." The entire disclosures of the above application are all incorporated herein by reference.

BACKGROUND

Technical Field

This disclosure relates to a hand tool, and in particular, to a multifunctional hand tool.

Description of Related Art

Regarding related hand tools such as screwdrivers, there are the following shortcomings to be overcome:

1. Although the related hand tools have interchangeable tool heads, the tool head can only be replaced on a top end of the hand tool, resulting in limited tool heads that can be chosen for use.
2. Although there are hand tools that allow changing of tool heads on both a top end and a bottom end, such hand tools have a problem of unable to increase the torque, which makes them unable to be used by users with less strength. This problem is continuously to be criticized.

SUMMARY

It is an objective of this disclosure to provide a multi-functional hand tool which the suitable tool heads may be selected on a top end and a bottom end of a metal working rod, and may increase the torque to the top end and the bottom end.

Accordingly, this disclosure provides a multifunctional hand tool for using with a torque exerting element, the multifunctional hand tool includes: a grip having an assembly hole and a polygonal coupling part disposed on the assembly hole; and a metal working rod having two action sections corresponding to at least a portion of the assembly hole. The two action sections are provided with a polygonal portion respectively, an insertion holes are disposed in the two polygonal portions respectively. The metal working rod is inserted into the assembly hole with one of the two action sections, one of the two polygonal portions is correspondingly engaged with the polygonal coupling part, the other one of the action sections is coupled to at least one of multiple tool heads, and the torque exerting element selectively exerts torque to the insertion hole disposed on the other one of the polygonal portions.

Comparing with the related techniques, this disclosure has the following functions. This disclosure may select suitable tool heads on the top end and the bottom end of the metal working rod, and may increase torque to the top end and the bottom end, so the versatility of the multifunctional hand tool may be achieved.

BRIEF DESCRIPTION OF THE DRAWINGS

The disclosure will become more fully understood from the detailed description and the drawings given herein below for illustration only, and thus does not limit the disclosure, wherein.

DETAILED DESCRIPTION

The detailed description and technical content of this disclosure are described as follows in conjunction with the accompanying drawings. However, the drawings are only for reference and description, and are not intended to limit this disclosure.

Figure 1:
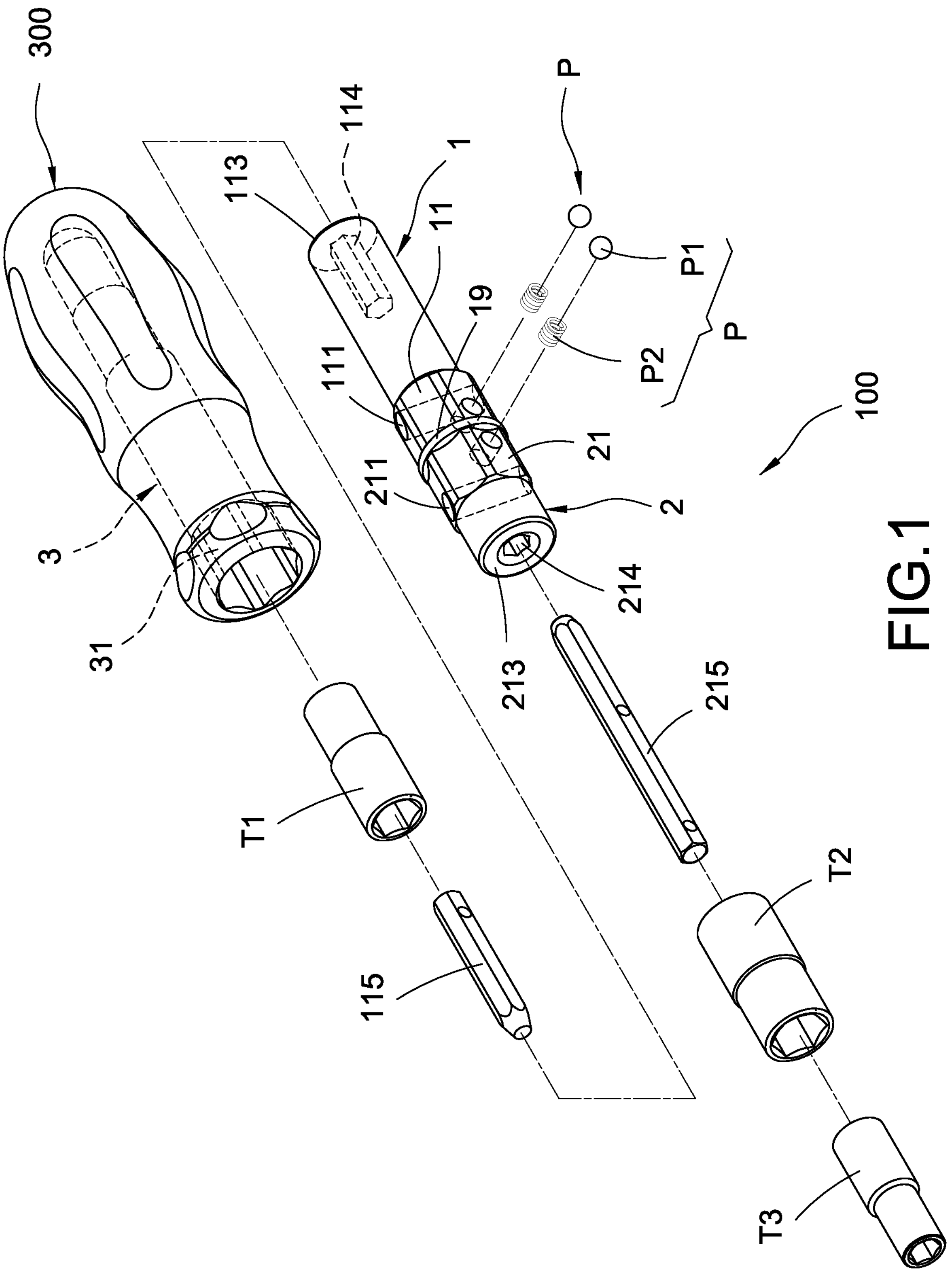
FIG. 1 is a perspective exploded view of a multifunctional hand tool of this disclosure.
Figure 2:
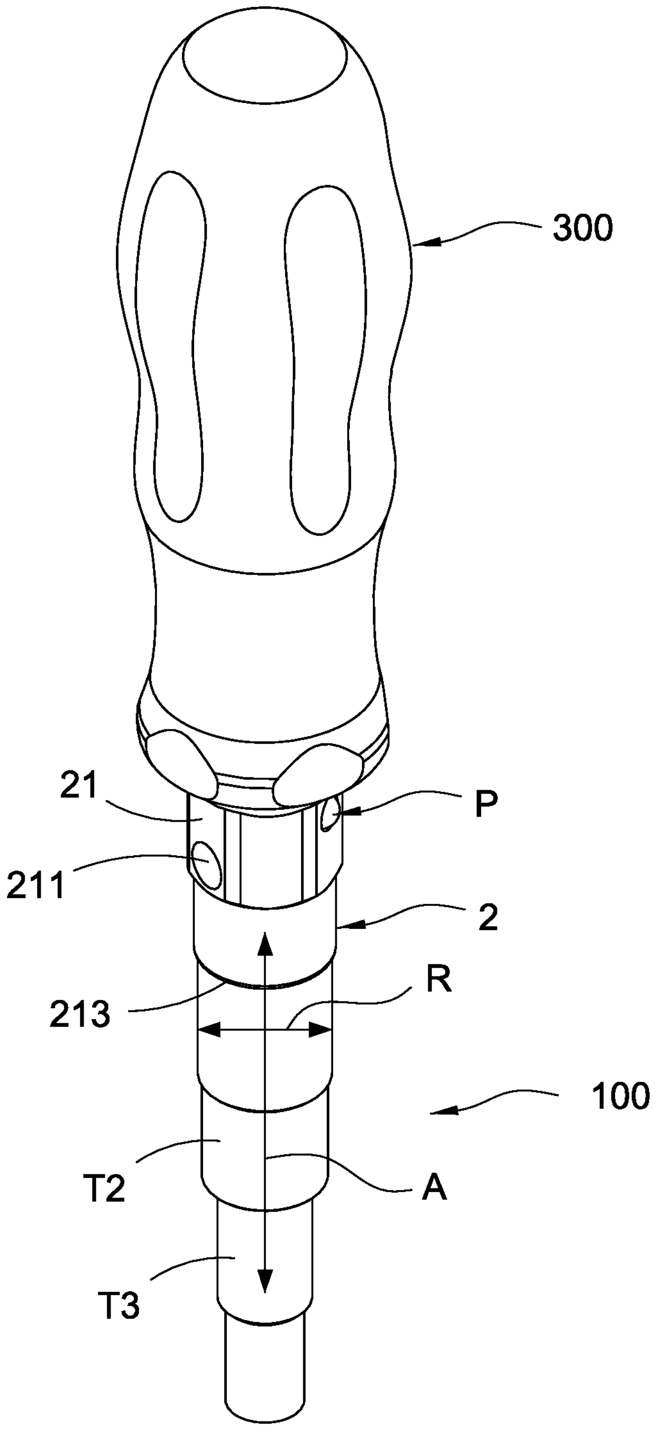
FIG. 2 is a perspective assembled view of the multifunctional hand tool of this disclosure in a first use state.

As shown in FIG. 1, this disclosure provides a multifunctional hand tool (hereinafter referred to as a hand tool), which may be used with at least one torque exerting element (for example: I1 shown in FIG. 4 or I2 shown in FIG. 6) to increase torque, and may have a variety of functions with suitable tool heads chosen as applicable. FIGS. 2 to 6 show the hand tool of this disclosure in a first use state, and FIGS. 7 to 10 show the hand tool of this disclosure in a second use state. The hand tool of this disclosure includes a metal working rod 100 and a grip 300. The metal working rod 100 has an axial direction A and a radial direction R crossing with each other as shown in FIG. 2.

Figure 3:
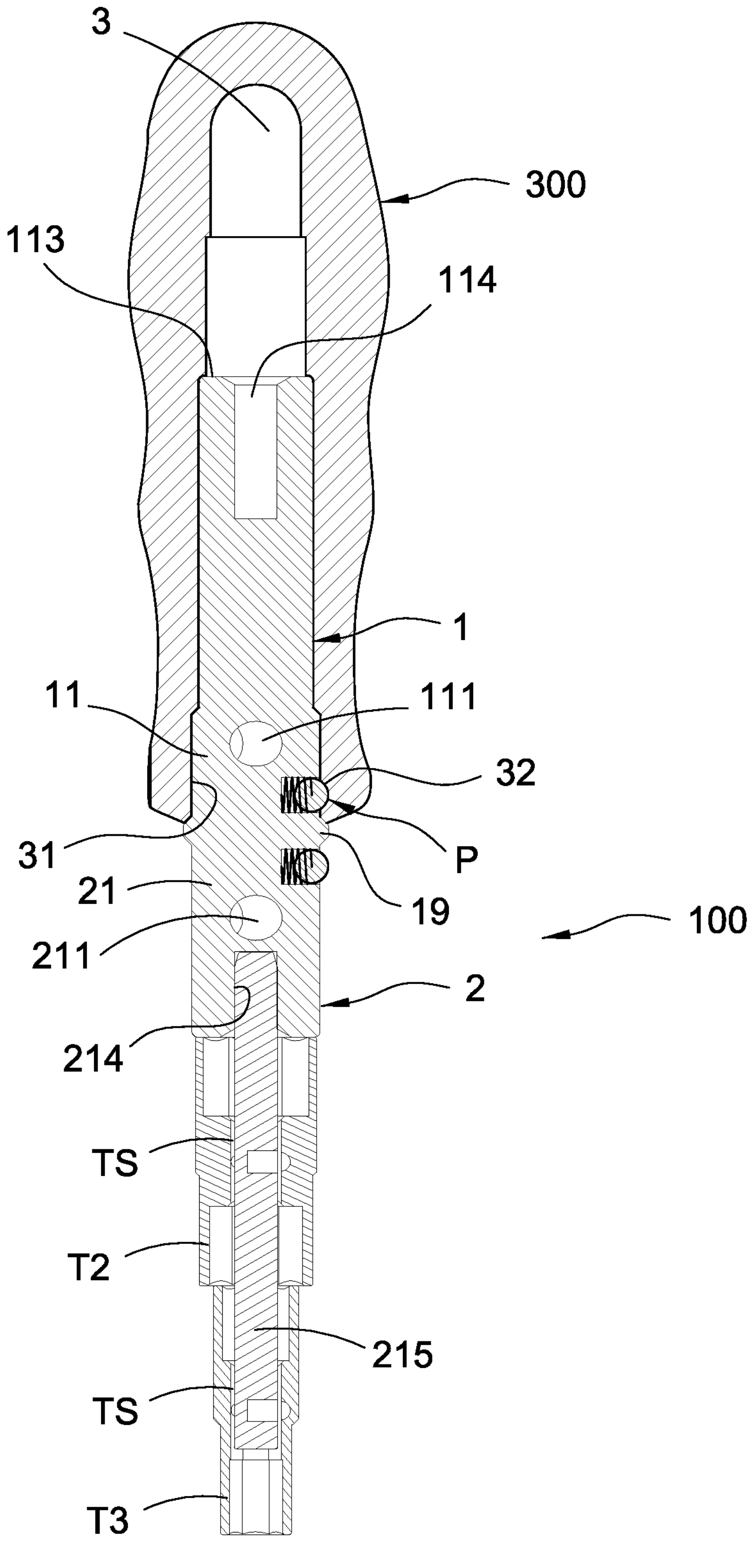
FIG. 3 is a schematic cross-sectional view of this disclosure according to FIG. 2.

As shown in FIGS. 1 to 3, a grip 300 may be made of any elastic material, such as plastic, and this disclosure is not limited in this regard. An assembly hole 3 is disposed in one end of the grip 300 along the axial direction A, and a polygonal coupling part 31 is disposed on the assembly hole 3.

The metal working rod 100 may be a rod made of any metal material. The metal working rod 100 is divided into a first action section 1 and a second action section 2. As shown in FIG. 1, two opposite ends of the metal working rod 100 are a first end 113 of the first action section 1 and a second end 213 of the second action section 2, respectively. Both the lengths of the first action section 1 and the second action section 2 are corresponding to a partial length of the assembly hole 3. In other words, the length of the first action section 1 and the length of the second action section 2 are each corresponding to the partial length of the assembly hole 3, and the first action section 1 and the second action section 2 may be inserted into the assembly hole 3. At least one tool head (e.g., T1, T2, T3, and etc.) may be assembled to the first end 113 of the first action section 1 and the second end 213 of the second action section 2 along the axial direction A. The first action section 1 is provided with (such as integrally formed with) or one-piece formed with a first polygonal portion 11, the second action section 2 is provided (such as integrally formed with) with or one-piece formed with a second polygonal portion 21, and the first polygonal portion 11 and the second polygonal portion 21 are close to or adjacent to each other in the axial direction A. A first insertion hole 111 and a second insertion hole 211 are disposed along the radial direction R in the first polygonal portion 11 and the second polygonal portion 21, respectively.

It should be noted that when the first action section 1 is inserted into the assembly hole 3 of the grip 300, the second action section 2 (including the second polygonal portion 21) is exposed outside the grip 300. On the contrary, when the second action section 2 is inserted into the assembly hole 3 of the grip 300, the first action section 1 (including the first polygonal portion 11) is exposed outside the grip 300. The metal working rod 100 includes a stopping element 19. The stopping element 19 is connected between the first polygonal portion 11 of the first action section 1 and the second polygonal portion 21 of the second action section 2. When the metal working rod 100 is inserted into the assembly hole 3, the stopping element 19 and the grip 300 are blocked with each other outside the assembly hole 3, thereby an insertion depth of the metal working rod 100 is maintained. The stopping element 19 may be an annular flange, and an outer diameter of the stopping element 19 is greater than an inner diameter of the assembly hole 3.

It should also be noted that an outer diameter of the first action section 1 and an outer diameter of the second action section 2 are different from each other, and it is preferable that a length of the first action section 1 and a length of the second action section 2 are also different from each other, which facilitates choosing suitable tool heads for assembly and use. The length of the first action section 1 is greater than the length of the second action section 2, so that the first end 113 abuts against a step (a level difference) of an inner surface (not labelled) inside the assembly hole 3 as shown in FIG. 3. In addition, a total length of the first action section 1 after the assembly of the tool head T1 may be substantially equal to a total length of the second action section 2 after the assembly of the tool head T2 and the tool head T3.

Accordingly, when the user chooses to insert the first action section 1 into the assembly hole 3 of the grip 300 along the axial direction A, the first polygonal portion 11 is engaged with the polygonal coupling part 31 to facilitate the grip 300 to drive the metal working rod 100 to rotate. Then, the suitable tool heads T2 and T3 are selected to be assembled along the axial direction A to the second end 213 of the second action section 2, so that the hand tool of this disclosure is in the first use state, and the user may choose to use the tool head T2 or the tool head T3, which is convenient.

Figure 4:
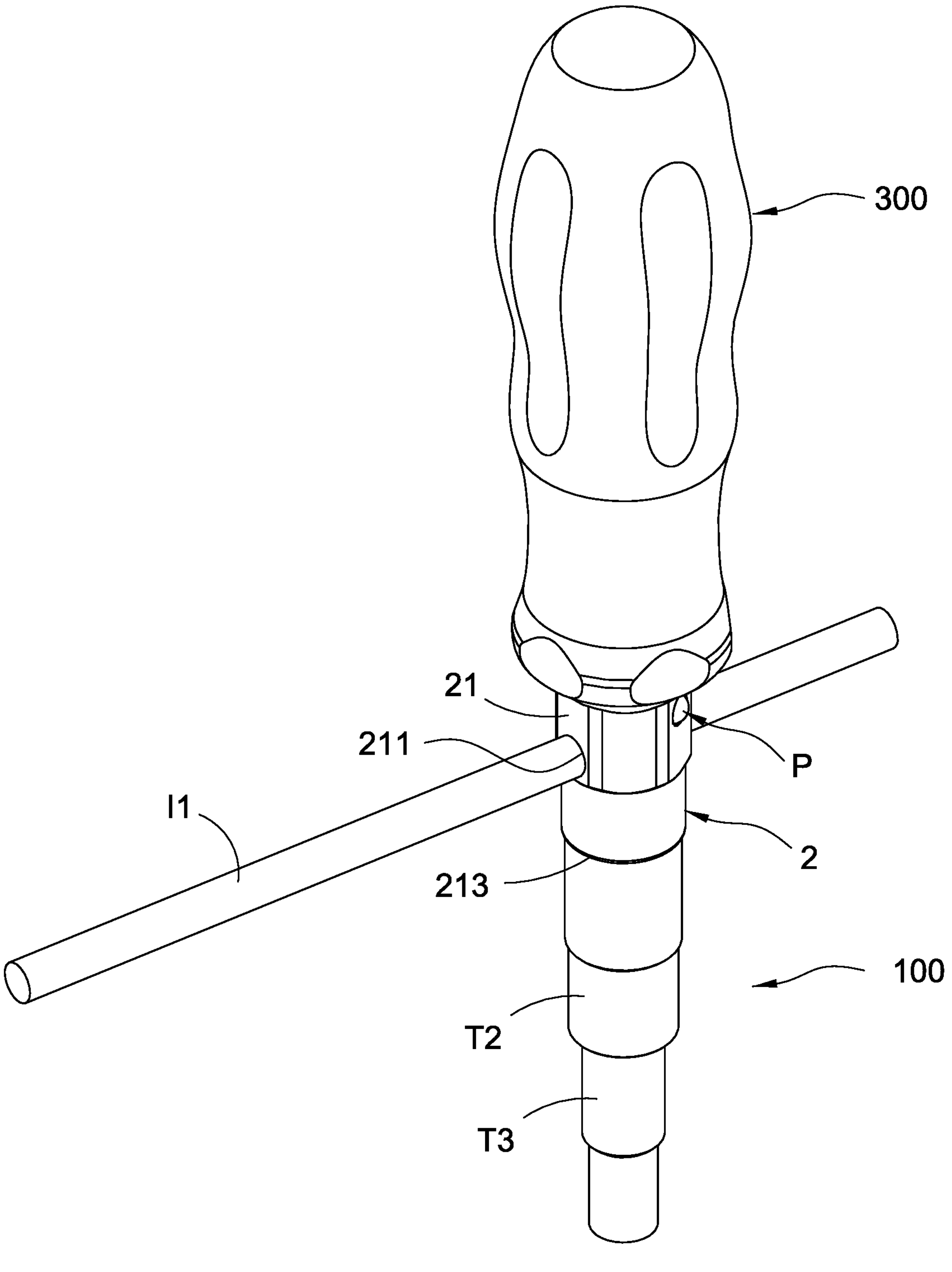
FIG. 4 is a perspective view of the multifunctional hand tool of this disclosure in the first use state in which torque is increased by a torque exerting element.
Figure 5:
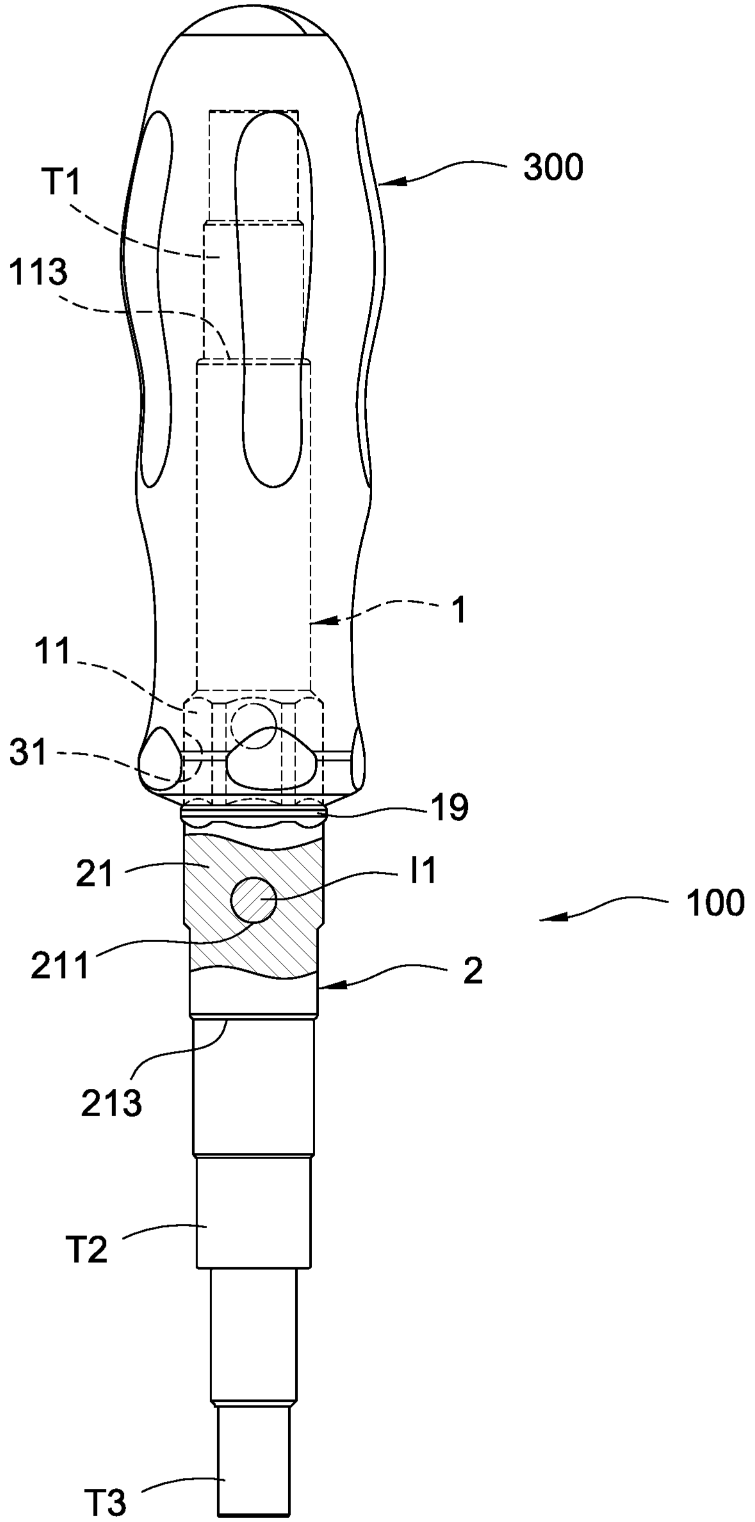
FIG. 5 is a schematic cross-sectional view of this disclosure according to FIG. 4.
Figure 6:
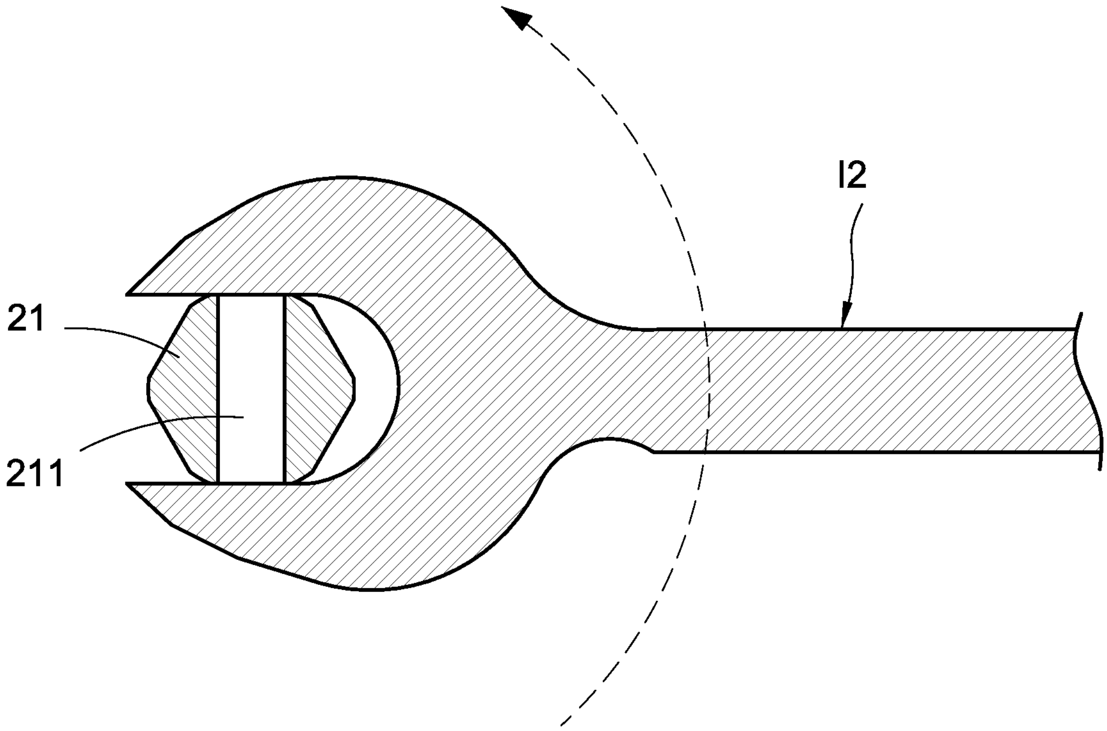
FIG. 6 is a partial cross-sectional schematic view illustrating the multifunctional hand tool of this disclosure in the first use state in which torque is increased by another torque exerting element.
Figure 7:
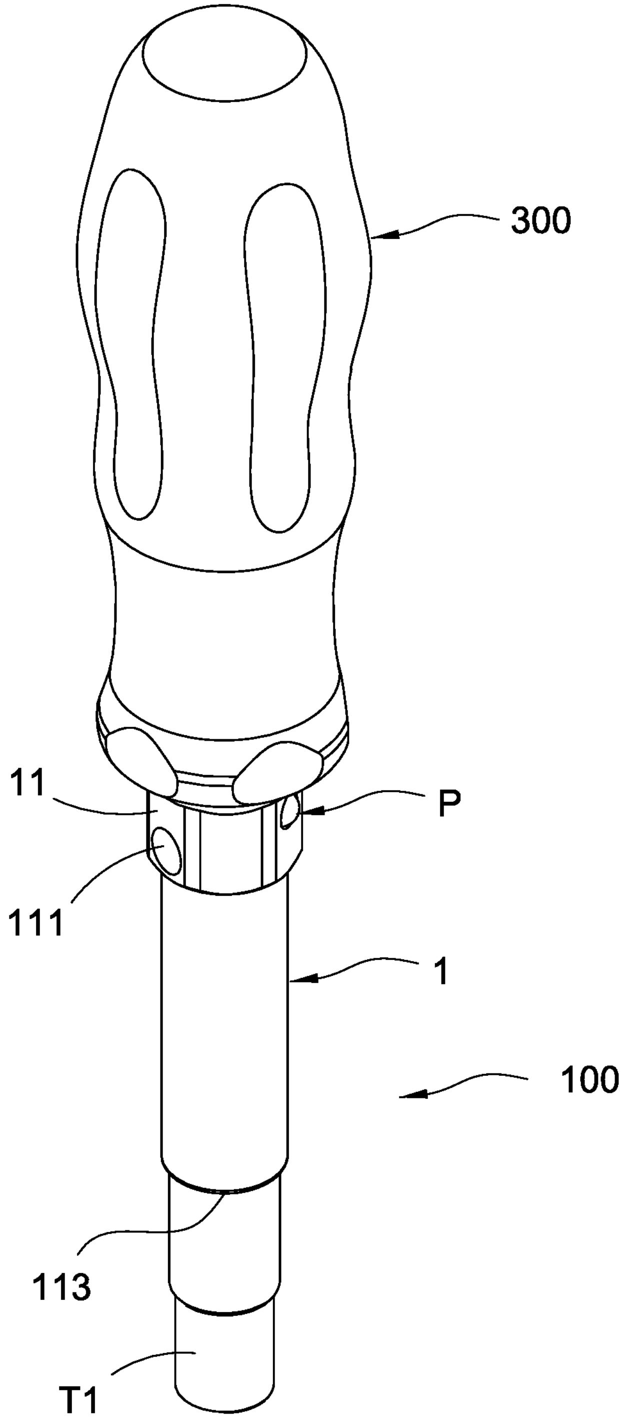
FIG. 7 is a perspective assembled view of the multifunctional hand tool in a second use state according to this disclosure.

Furthermore, when the torque needs to be increased, a longer moment arm (a distance between the other end of the torque exerting element I1 and the second polygonal portion 21) may be obtained to rotate the second polygonal portion 21 by inserting one end of the torque exerting element I1 (e.g., simply a rod or a screwdriver etc.) into the second insertion hole 211 as shown in FIGS. 4 and 5, thus the torque is increased to drive the hand tool of this disclosure to rotate as desired. Alternatively, as shown in FIG. 6, another torque exerting element I2 (e.g., a wrench) may be used to clamp the second polygonal portion 21, so that the second polygonal portion 21 may be rotated with a longer moment arm, thus the torque is increased to drive the hand tool of this disclosure to rotate as desired.

It should be noted that, in addition to the torque exerting element I1 or the torque exerting element I2 as described above, the torque exerting element may also be a single-piece element (not illustrated in the figures) with dual function ends, for example, one end has a screwdriver and the other end has a wrench.

It should be noted that the tool head T1 may not be assembled to the first end 113 of the first action section 1 as shown in FIG. 3, so that a remaining space (not labelled) is formed in the assembly hole 3. In addition, the tool head T1 may be assembled to the first end 113 of the first action section 1, as shown in FIG. 5, so that the tool head T1 is received in the remaining space of the assembly hole 3. Thus, the assembly hole 3 may have a function of receiving the tool head.

The tool heads T1, T2, T3 may be screwdriver tips of various sizes, sleeves of various sizes, or drill bits of various sizes, etc.

Figure 8:
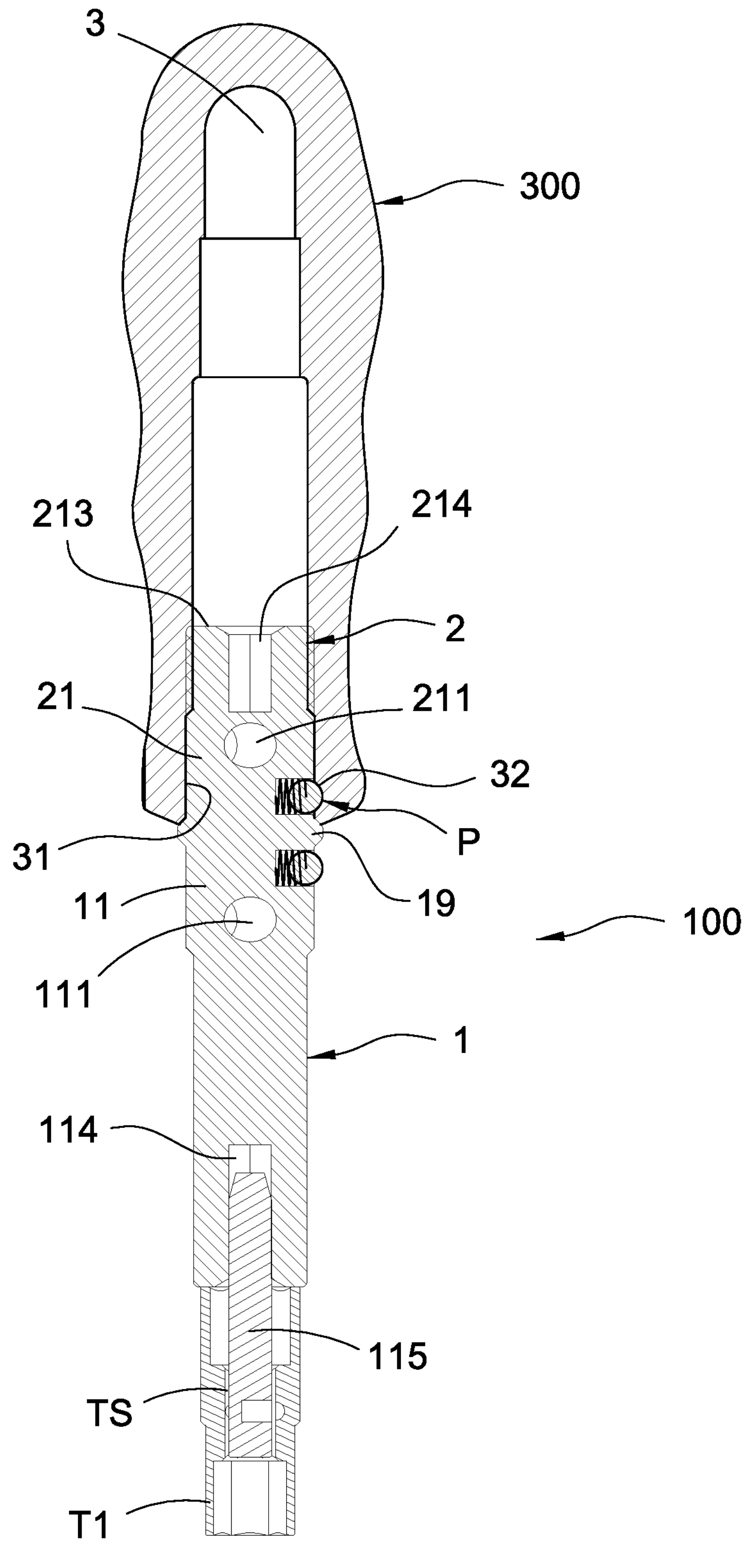
FIG. 8 is a schematic cross-sectional view of this disclosure according to FIG. 7.

This disclosure does not limit how the tool heads T1, T2, T3 are assembled to the first action section 1 and the second action section 2. In this embodiment, this paragraph is taken as an example for illustration. As shown in FIGS. 1 to 3, the first action section 1 and the second action section 2 are also provided with a first polygonal rod 115 and a second polygonal rod 215, respectively. A first polygonal socket 114 and a second polygonal socket 214 are disposed along the axial direction A in the first end 113 of the first action section 1 and the second end 213 of the second action section 2, respectively. A part of the first polygonal rod 115 and a part of the second polygonal rod 215 are respectively inserted into and engaged with the first polygonal socket 114 and the second polygonal socket 214. A remaining part of the first polygonal rod 115 and a remaining part of the second polygonal rod 215 are exposed outside the first polygonal socket 114 and second polygonal socket 214, respectively. Each of the aforementioned tool heads T1, T2, T3 has a polygonal hole TS along the axial direction A as shown in FIGS. 3 and 8. As shown in FIG. 3, the selected tool heads T2 and T3 may be detachably sleeved on the remaining part of the second polygonal rod 215 with the polygonal hole TS. In other embodiments not illustrated, the remaining part of the second polygonal rod 215 may also be directly used as a polygonal wrench (such as a hexagonal wrench). Alternatively, for example, one of the tool heads may be chosen, such as a flathead screwdriver tip or a cross screwdriver (i.e., Phillips screwdriver) tip, to be inserted into and engaged with the first polygonal socket 114 or the second polygonal socket 214 to be used as a screwdriver. Alternatively, one of the tool heads may be chosen, such as a flathead screwdriver tip or a cross screwdriver tip, to be inserted into and engaged with a polygonal receiving hole (not labelled) in one end of the tool heads T1, T2, T3 to be used as a screwdriver.

As shown in FIGS. 1 to 3, in order for the first action section 1 and the second action section 2 to be positioned when inserted into the assembly hole 3, the first polygonal portion 11 and the second polygonal portion 21 are each provided with a positioning structure P along the radial direction R, and the polygonal coupling part 31 of the grip 300 is provided with a positioning portion 32 corresponding to any one of the positioning structures P. In detail, each positioning structure P includes a ball P1 and a resilient element P2, and the two balls P1 are respectively embedded in blind holes (not labelled) of the first polygonal portion 11 and the second polygonal portion 21, the two resilient elements P2 are respectively disposed between one of the balls P1 and the first polygonal portion 11 and between the other ball P1 and the second polygonal portion 21 in the two blind holes, so that the ball P1 of the first action section 1 may resiliently engage the positioning portion 32 for a positioning effect through the resilient supporting from the resilient element P2.

FIGS. 7 to 10 show the hand tool of this disclosure in the second use state. The second use state is nearly the same as the first use state, except that the second action section 2 is chosen to be inserted into the grip 300, and the tool heads that may be chosen for use are different from those in the first use state. Details are provided as below.

Figure 9:
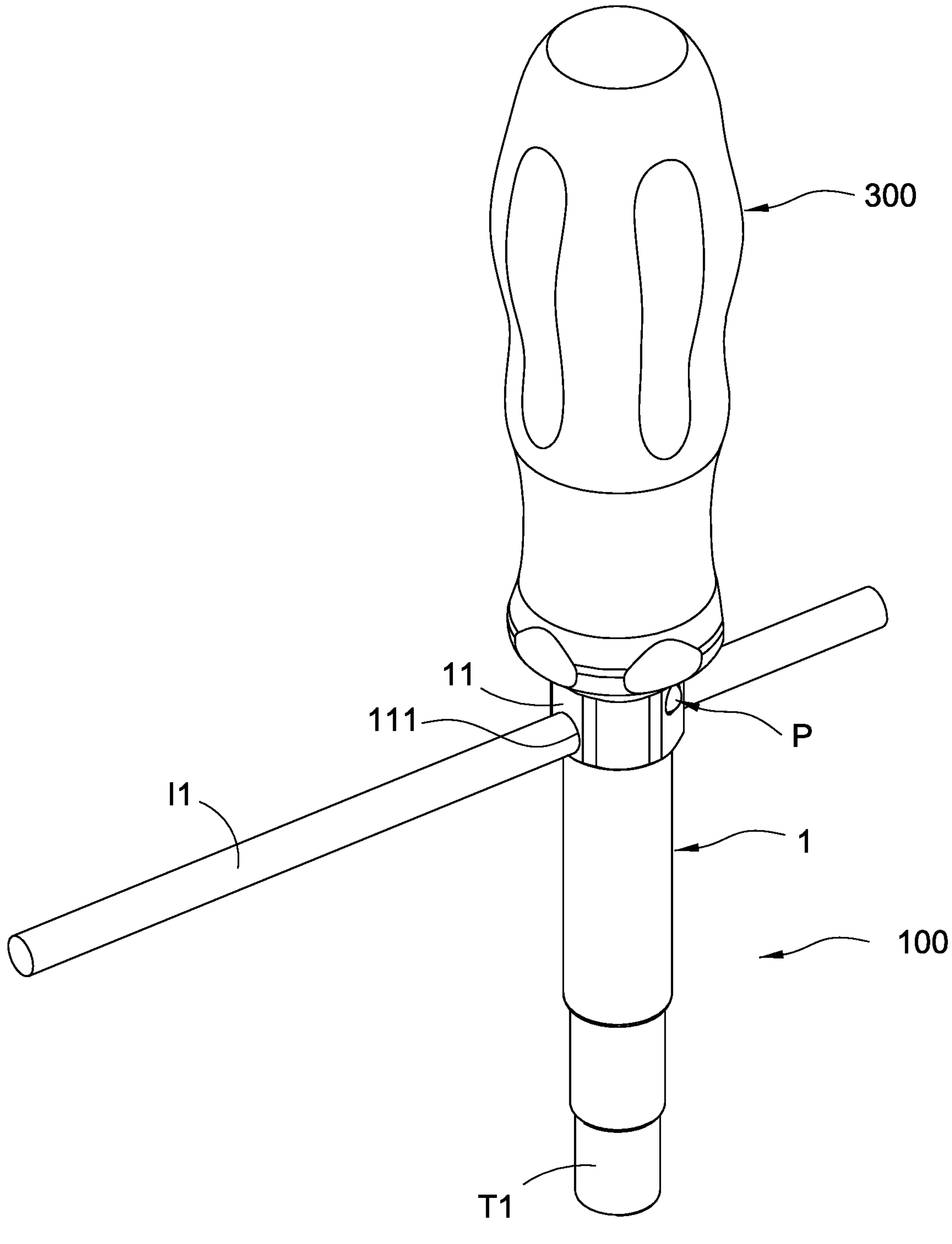
FIG. 9 is a perspective view of the multifunctional hand tool of this disclosure in the second use state in which torque is increased by a torque exerting element.
Figure 10:
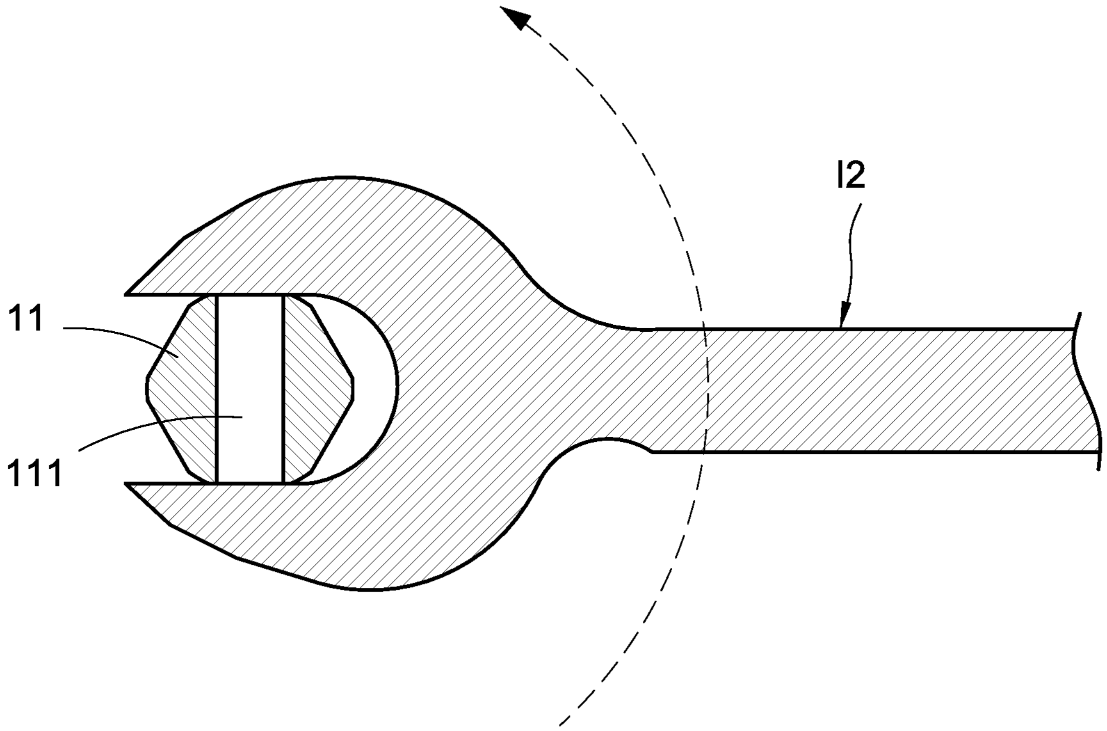
FIG. 10 is a partial cross-sectional schematic view illustrating the multifunctional hand tool of this disclosure in the second use state in which torque is increased by another torque exerting element.

When the user chooses to insert the second action section 2 into the assembly hole 3 of the grip 300, the second polygonal portion 21 is engaged with the polygonal coupling part 31, so that the suitable tool head T1 may be selected to be assembled to the first end 113 of the first action section 1, and thereby the hand tool of this disclosure is in the second use state. Moreover, when the torque needs to be increased, the first polygonal portion 11 may be rotated with a longer moment arm by simply inserting the torque exerting element I1 into the first insertion hole 111 as shown in FIG. 9. Alternatively, as shown in FIG. 10, another torque exerting element I2 may clamp the first polygonal portion 11, so that the first polygonal portion 11 may be rotated with a longer moment arm. In addition, the user may not assemble the tool heads T2 and T3 to the second action section 2 as shown in FIG. 8, so that another remaining space (not labelled) is formed in the assembly hole 3. Certainly, the user may assemble the tool heads T2 and T3 (not illustrated) to the second action section 2 to accommodate the tool heads T2 and T3 in another remaining space of the assembly hole 3.

To sum up, the multifunctional hand tool of this disclosure may achieve the intended purpose, and solves the defects of related techniques. The above is only the feasible embodiments of this disclosure, and not intended to limit the protection scope of this disclosure. Equivalent changes and structural modifications based on the description and drawings of this disclosure should be deemed to be within the protection scope of this disclosure.

What is claimed is:

1. A multifunctional hand tool for using with a torque exerting element, the multifunctional hand tool comprising:

a grip, comprising an assembly hole and a polygonal coupling part disposed on the assembly hole; and a metal working rod, comprising two action sections corresponding to at least a portion of the assembly hole, a polygonal portion is disposed on each of the two action sections respectively, an insertion hole is disposed on each of the two polygonal portions respectively;

wherein the metal working rod is inserted into the assembly hole with one of the two action sections, one of the two polygonal portions is correspondingly engaged with the polygonal coupling part, the other one of the action sections is coupled to at least one of multiple tool heads, and the torque exerting element selectively exerts torque to the insertion hole disposed on the other one of the polygonal portions, the metal working rod comprises an axial direction and two ends respectively belonging to the two action sections, a polygonal socket is disposed on each of the two ends along the axial direction, each of the two action sections comprises a polygonal rod, a part of one of two polygonal rods serves as a flathead screwdriver tip or a cross screwdriver, and the part of the one of the two polygonal rods is detachably coupled to at least one of the tool heads;

wherein each of the multiple tool heads comprises a polygonal hole along the axial direction, and two of the multiple tool heads are detachably connected to a same side of each one of the polygonal rods through multiple polygonal holes.

2. The multifunctional hand tool according to claim 1, wherein the metal working rod further comprises a stopping element connected between the two action sections, and the metal working rod is blocked by the stopping element in the grip.

3. The multifunctional hand tool according to claim 1, wherein the metal working rod comprises a radial direction crossing with the axial direction, the assembly hole is disposed along the axial direction, and each of the insertion holes is disposed along the radial direction.

4. The multifunctional hand tool according to claim 3, wherein two ends of the metal working rod are configured to couple with the tool heads along the axial direction.

5. The multifunctional hand tool according to claim 1, wherein a remaining part of each of the two polygonal rods is inserted into each of the two polygonal sockets correspondingly, and the part of each of the two polygonal rods is exposed from each of the two polygonal sockets correspondingly.

6. The multifunctional hand tool according to claim 1, wherein the one of the two action sections is coupled to at least one of the tool heads, and the assembly hole accommodates the at least one of the tool heads.

7. The multifunctional hand tool according to claim 1, wherein a positioning structure is disposed on each of the two polygonal portions, a positioning portion is disposed on the polygonal coupling part corresponding to any one of the positioning structures, and the metal working rod is positioned by one of the two positioning structures being detachably engaged with the positioning portion.

8. The multifunctional hand tool according to claim 7, wherein the positioning structure comprises a ball and a resilient element, the ball is embedded in the polygonal portion, the resilient element is disposed between the ball and the polygonal portion, and the ball is resiliently supported by the resilient element and positioned by being pushed into the positioning portion.

* * * * *